Patented Dec. 25, 1923.

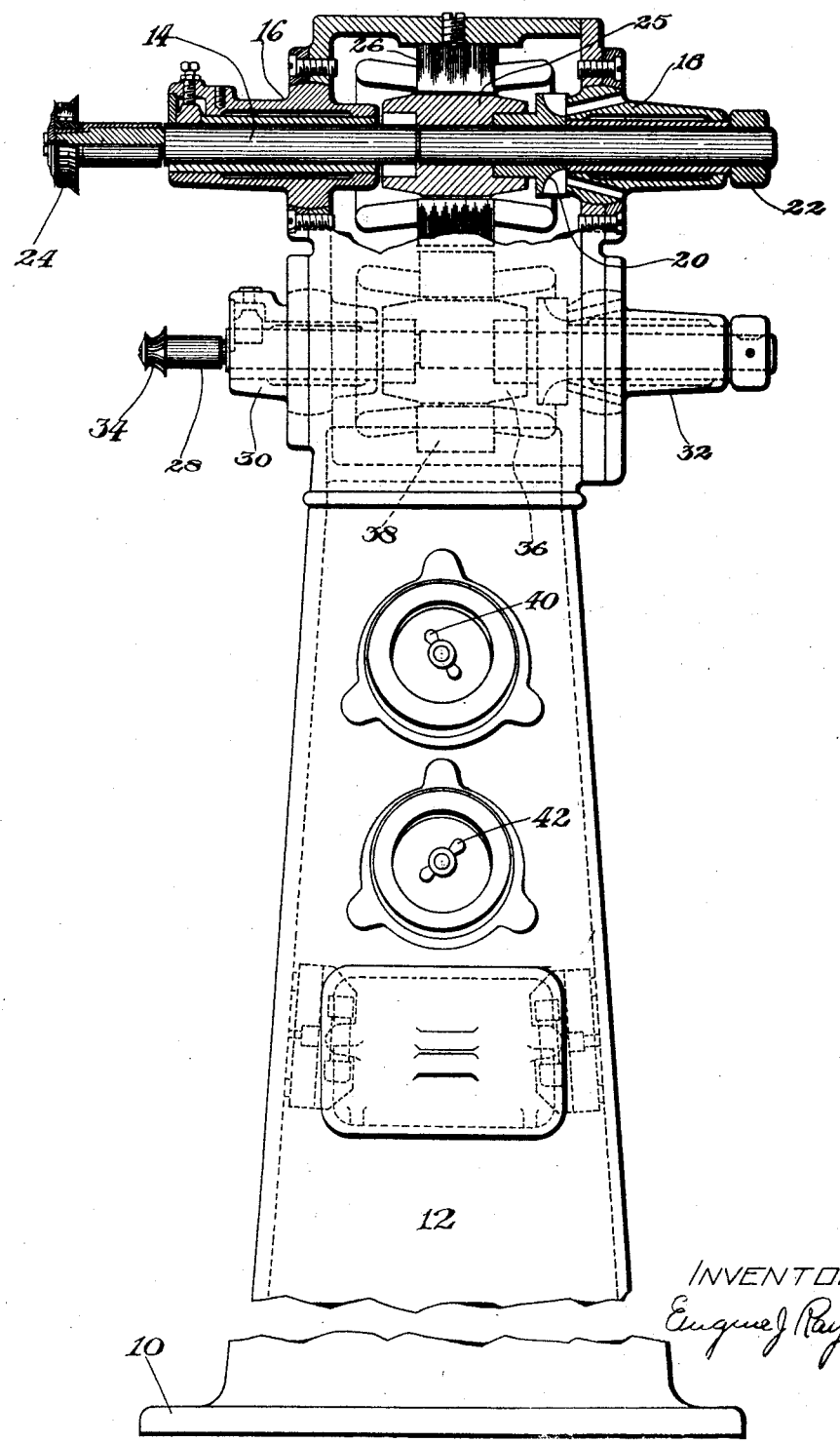

1,478,797

UNITED STATES PATENT OFFICE.

EUGENE J. RAY, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR TRIMMING THE EDGES OF BOOTS AND SHOES.

Application filed February 8, 1922. Serial No. 535,050.

*To all whom it may concern:*

Be it known that I, EUGENE J. RAY, a citizen of the United States, residing at Beverly, in the county of Essex and State of Massachusetts, have invented certain Improvements in Machines for Trimming the Edges of Boots and Shoes, of which the following description, in connection with the accompanying drawings, is a specification, like reference characters on the drawings indicating like parts in the several figures.

This invention relates to trimming machines. The invention is herein illustrated as embodied in a machine especially designed for trimming the edges of soles of boots and shoes.

Machines for trimming the edges of soles and heels have always presented a peculiarly difficult problem because of the liability of such machines to develop objectionable vibration of the trimming cutters. In the use of edge-trimming machines under the present practice, a shoe is held entirely in the hands of the operator, who determines by eye the depth and direction of the trimming cut, and is operated upon by the periphery of a rotary cutter, so that even slight cutter vibration produces an irregular or wavy edge. Heretofore, also, such machines have been driven from factory shafting by belt gearing which necessarily exerts a side pull on the cutter shafts tending to unbalance the shafts so as to induce irregular cutter action. Moreover, belt gearing is characteristically liable to develop uneven or whipping action due to irregularities produced by the belt lacing or otherwise, or because a belt pulley is out of true, wabbles, or is for any other reason unbalanced. Then, too, such a machine requires that the belting be unusually tight to maintain sufficient traction, and the necessary tightness of the belting results in rapid wear of the cutter shaft and its bearings, with the necessity of frequent renewal of the shaft bushings. By reason of the further fact that such trimming cutters commonly run at approximately ten thousand revolutions per minute, the above referred to and other similar conditions are very much aggravated, with the result that for one reason or another it is difficult and often practically impossible to maintain the cutters free from harmful vibration and to produce satisfactory edge-trimming even with the most painstaking and skillful work on the part of an operator.

Improper edge-trimming results either in making shoes unsalable, or requires expensive work to repair the damage as well as possible, since shoes of the better grades and even medium grade shoes depend for their ready salability to a large extent upon their pleasing appearance, and one conspicuous and outstanding requisite of an attractive shoe is that it have smooth, well-finished sole and heel edges.

Because of the above-mentioned and other conditions, it has been customary to brace edge-trimming machines to the factory floor, walls or ceiling. It has also been proposed to provide such machines with a resilient mounting especially designed to absorb shocks, and so to minimize vibration. None of the attempts made heretofore, however, has addressed itself to the problem of so organizing the driving mechanism as to eliminate the inception of vibration.

In view of the foregoing, it is an object of the present invention to provide an edge-trimming machine, the operating mechanism of which is so organized that it may be depended upon to operate practically without vibration, and which will be free from belt troubles and excessive wear and tear resulting therefrom, and economical and reliable to maintain and operate in this and other respects.

In the attainment of this object, the present invention provides a novel organization comprising, as herein illustrated, a rotating cutter having its periphery formed to trim margins of shoe parts, such as the edges of soles or heels, which cutter is carried on the end of a shaft mounted between stationary spaced bearings on a rigid base or frame and driven by a high speed motor having its rotor mounted directly on the shaft concentrically therewith. In this construction, the cutter shaft constitutes the rotor shaft of the motor, and it is not only practicable to balance the moving parts of the machine with extreme accuracy, but in the operation of the machine there is no force other than the very slight pressure of the work against the cutter tending to throw the rotating parts of the machine out of balance. Consequently, not only is undesirable cutter shaft vibration prevented, but the wear on the bearings and shafts is so slight as to be negligible even over a long period. If the machine is designed for sole edge-trimming, preferably, and as herein shown, it may be organized for both forepart and shank edge-trimming by the provision of a plurality of driving shafts and trimming cutters, each of which shafts has a high speed motor mounted thereon. It has been found that machines of this type, with the cutters mounted directly upon the rotor shafts of their motors, have in shoe factory operation a capacity substantially greater than that of the old belt driven machines. This increased capacity of the machines of applicant's invention is conservatively estimated as at from 10 to 20 per cent and is due to such things as the fact that the new machines will operate in a fully satisfactory manner while making a heavier cut than the old machines, so that in many cases with the new machines all the material to be removed may be taken off with a single cut while with the old machines it is necessary in order to remove the surplus stock and to produce a smooth edge to go over at least part of the work twice, and to the fact that, since there is no belt slippage or anything analogous to it, the cutters of the machines revolve at a uniform speed so that the trimming is of uniform excellence and there is no necessity for going back and touching up portions of the work which have been poorly trimmed.

A preferred embodiment of the invention is illustrated in the accompanying drawing which represents a front elevation, partly in section, of a machine for trimming the edges of soles of shoes.

As illustrated the machine is provided with a frame comprising a base 10 and a column 12 rising from the base and of such a height that edge-trimming means carried near the top of the column will be about breast-high to the operator. A cutter shaft 14 is carried near the top of the column, being illustrated as mounted in stationary, horizontal, self-alining bearings 16, 18, so as to facilitate the assembling of the machine. Collars 20, 22 may be fixed to shaft 14 to cooperate with one of the bearings to prevent endwise movement of the shaft. Mounted upon one end of the shaft is an edge-trimming cutter 24 illustrated as of a form such as is ordinarily used to trim the forepart of the edges of soles of shoes, and accordingly having its periphery shaped to trim the edges of the soles substantially to their final form.

Mounted upon shaft 14 between bearings 16 and 18 and concentric with the shaft is the rotor 25 of a motor, illustrated as the rotor of a high-speed electric motor of a well-known type. The stator 26 of the motor surrounds the rotor and cutter shaft and is carried by the column. With this construction the rotor and cutter shaft may be balanced with a very high degree of accuracy, after the rotor has been permanently fixed to the shaft, and since there is no force during the operation of the machine tending to throw these parts out of balance, except the very slight pressure of the work held in the hands of the operator against the periphery of the trimming tool, there is nothing to cause cutter shaft vibration nor any unbalanced load upon the bearings. Consequently the machine can be depended upon to operate over a long period of time without appreciable wear of the bearings and with a complete absence of the troubles referred to above as besetting machines of this type.

The column 12 is also illustrated as carrying a second shaft 28 mounted in self-alining bearings 30, 32 supported by the column. Shaft 28 carries a shank-trimming cutter 34 upon one end thereof. This shaft is driven in the same manner as shaft 14 by a motor having its rotor 36 fast upon shaft 28 and concentric therewith and its stator 38 surrounding the rotor and carried by the column.

Switches 40, 42 of any convenient form may be mounted upon the column 12 and arranged to control the two motors in any usual or convenient manner.

In a practical embodiment of the invention which has been operated with complete success a cutter-shaft speed of about 9600 revolutions per minute has been maintained satisfactorily by the use of two-pole induction motors operating on an alternating current circuit having a frequency of 162 cycles, this high frequency current being derived from the usual 60 cycle alternating current by means of a frequency changer of ordinary construction.

Having thus described my invention, what I claim as new and desire to secure by Letters Patent of the United States is:

1. An edge-trimming machine having a frame carrying a pair of spaced bearings, a shaft mounted in said bearings, a cutter carried by one end of the shaft and having its periphery shaped to trim the edges of shoe parts substantially to their final form, and a high-speed motor having its rotor mounted directly on the shaft concentrically therewith and between said bearings.

2. An edge-trimming machine having a frame, a bearing carried thereby, a shaft mounted in the bearing, a cutter mounted upon one end of the shaft and having its periphery shaped to trim the edge of a shoe part substantially to its final form and a high-speed motor having its rotor mounted directly upon the shaft concentrically therewith and upon the side of the bearing remote from the cutter.

3. An edge-trimming machine having a cutter shaft, an edge-trimming cutter carried by the shaft and having its periphery shaped and arranged to trim the edge of a shoe part held in the hands of an operator substantially to its final form, and a high speed electric motor having its rotor mounted directly upon the cutter shaft concentrically therewith.

4. An edge-trimming machine having a column, a horizontal cutter shaft journaled in the upper part of the column, an edge-trimming cutter carried by the shaft, and a high speed, high frequency, induction motor having its rotor mounted directly on and balanced with respect to the axis of rotation of the cutter shaft and its stator carried by the column and surrounding the cutter shaft.

In testimony whereof I have signed my name to this specification.

EUGENE J. RAY.